US012666401B2

(12) United States Patent
Zhang et al.

(10) Patent No.: US 12,666,401 B2
(45) Date of Patent: Jun. 23, 2026

(54) COMMUNICATION METHOD AND APPARATUS, AND READABLE STORAGE MEDIUM

(71) Applicant: HUAWEI TECHNOLOGIES CO., LTD., Shenzhen (CN)

(72) Inventors: Tianhong Zhang, Beijing (CN); Haining Huang, Beijing (CN); Chao Li, Beijing (CN); Lili Zhang, Beijing (CN); Fan Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 18/164,300

(22) Filed: Feb. 3, 2023

(65) Prior Publication Data

US 2023/0180192 A1     Jun. 8, 2023

Related U.S. Application Data

(63) Continuation of application No. PCT/CN2020/107423, filed on Aug. 6, 2020.

(51) Int. Cl.
*H04W 72/02* (2009.01)
*H04W 72/0453* (2023.01)
(Continued)

(52) U.S. Cl.
CPC ....... *H04W 72/02* (2013.01); *H04W 72/0453* (2013.01); *H04W 72/25* (2023.01); *H04W 72/563* (2023.01)

(58) Field of Classification Search
CPC . H04W 72/02; H04W 72/0453; H04W 72/25; H04W 72/563; H04W 4/46;
(Continued)

(56) References Cited

U.S. PATENT DOCUMENTS

2017/0367087 A1    12/2017  Seo
2018/0049220 A1     2/2018  Patil et al.
(Continued)

FOREIGN PATENT DOCUMENTS

CN        111083732 A      4/2020
CN        111432483 A      7/2020
(Continued)

OTHER PUBLICATIONS

Office Action in Indian Appln. No. 202337008079, mailed on Feb. 18, 2025, 3 pages (with English translation).
(Continued)

*Primary Examiner* — Thomas R Cairns
*Assistant Examiner* — Raenita Ann Fenner
(74) *Attorney, Agent, or Firm* — Fish & Richardson P.C.

(57) ABSTRACT

Embodiments of this application provide communication methods, apparatuses, and readable storage media. One method includes: receiving, by a second device from a first device, a first priority for the second device in selecting a resource for sidelink transmission of the first device and a second priority indicating a priority of the PSSCH, wherein the first priority is carried in sidelink control information (SCI) on a physical sidelink shared channel (PSSCH) or a medium access control control element (MAC CE), and wherein the second priority is carried in SCI on a physical sidelink control channel (PSCCH), and selecting, by the second device based on the first priority, a resource for sidelink transmission of the first device.

18 Claims, 7 Drawing Sheets

(51) Int. Cl.
    *H04W 72/25*          (2023.01)
    *H04W 72/563*         (2023.01)

(58) Field of Classification Search
     CPC ....... H04W 4/40; H04W 72/56; H04W 92/18;
                                           H04L 5/0053
     See application file for complete search history.

(56)                 References Cited

U.S. PATENT DOCUMENTS

| | | |
|---|---|---|
| 2019/0327753 A1 | 10/2019 | Lee et al. |
| 2020/0037343 A1 | 1/2020 | He et al. |
| 2020/0053743 A1 | 2/2020 | Cheng |
| 2020/0229210 A1 | 7/2020 | Bharadwaj et al. |
| 2023/0180267 A1* | 6/2023 | Chae ..................... H04L 5/0048 |
| | | 370/328 |
| 2023/0189390 A1* | 6/2023 | Park ...................... H04W 76/28 |
| | | 370/252 |
| 2023/0309134 A1* | 9/2023 | Leon Calvo ........ H04W 72/563 |

FOREIGN PATENT DOCUMENTS

| | | | |
|---|---|---|---|
| EP | 3672133 A1 | 6/2020 | |
| EP | 3672337 A2 | 6/2020 | |
| JP | 2020510378 A | 4/2020 | |
| WO | 2020030177 A1 | 2/2020 | |
| WO | 2020036426 A1 | 2/2020 | |
| WO | 2020151695 A1 | 7/2020 | |
| WO | 2020153721 A1 | 7/2020 | |

OTHER PUBLICATIONS

Office Action in Japanese Appln. No. 2023-507685, mailed on Jun. 18, 2024, 12 pages (with English translation).

Media Tek Inc., "On Sidelink Resource Allocation Mechanism," 3GPP TSG RAN WG1 Meeting #95, R1-1812367, Spokane, USA, Nov. 12-16, 2018, 10 pages.

3GPP TR 37.885 V15.3.0, "3rd Generation Partnership Project; Technical Specification Group Radio Access Network; Study on evaluation methodology of new Vehicle-to-Everything (V2X) use cases for LTE and NR; (Release 15)," Jun. 2019, 38 pages.

Fraunhofer Hhi et al., "Designs for NR V2X Mode 2 Resource Allocation," 3GPP TSG RAN WG1 Meeting #95, R1-1812399, Spokane, USA, Nov. 12-16, 2018, 10 pages.

3GPP TS 38.212 V16.2.0, "3rd Generation Partnership Project; Technical Specification Group Radio Access Network; NR; Multiplexing and channel coding (Release 16)," Jun. 2020, 151 pages.

LG Electronics, "Discussion on resource allocation mechanism for NR V2X," 3GPP TSG RAN WG1 Meeting #95, R1-1812844, Spokane, USA, Nov. 12-16, 2018, 12 pages.

3GPP TS 38.214 V16.2.0, "3rd Generation Partnership Project; Technical Specification Group Radio Access Network; NR; Physical layer procedures for data (Release 16)," Jun. 2020, 163 pages.

CATT, "Discussion on resource allocation mechanism for sidelink Mode 2 in NR V2X," 3GPP TSG RAN WG1 Meeting #98bis, R1-1910329, Chongqing, China, Oct. 14-20, 2019, 13 pages.

3GPP TS 38.321 V15.9.0, "3rd Generation Partnership Project; Technical Specification Group Radio Access Network; NR; Medium Access Control (MAC) protocol specification (Release 15)," Jul. 2020, 78 pages.

Huawei et al., "On Sidelink enhancement," 3GPP TSG RAN WG1 Meeting #101-e, R1-2004602, E-meeting, May 25-Jun. 5, 2020, 3 pages.

LG Electronics, "WID revision: NR sidelink enhancement," 3GPP TSG RAN Meeting #88e, RP-201385, Electronic Meeting, Jun. 29-Jul. 3, 2020, 6 pages.

Extended European Search Report in European Appln No. 20948445. 0, dated Jul. 26, 2023, 5 pages.

International Search Report and Written Opinion in International Appln. No. PCT/CN2020/107423, mailed on Apr. 29, 2021, 14 pages (with English translation).

3GPP TSG RAN WG1 Meeting #101-E R1-2004942, "Outcome and TP of [101-e-NR-5G_V2X_NRSL-Mode-2-05]," Moderator (Intel Corporation), e-Meeting, May 25-Jun. 5, 2020, 2 pages.

Office Action in Korean Appln. No. 10-2023-7007586, mailed on May 16, 2025, 10 pages (with English translation).

3GPP TS 38.321 V16.0.0, "3rd Generation Partnership Project; Technical Specification Group Radio Access Network; NR; Medium Access Control (MAC) protocol specification (Release 16)," Mar. 2020, 141 pages.

Office Action in Korean Appln. No. 10-2023-7007586, mailed on Jan. 27, 2026, 6 pages (with English translation).

* cited by examiner

Radio access network device

First device

SL

Second device

First device

Second device

S201: Information about a first priority
and a second priority

S202: Select, based on the information
about the first priority, a resource for
sidelink transmission

| R | R | LCID | Byte 1 |
|---|---|------|--------|

FIG. 6

| R | F | LCID | Byte 1 |
|---|---|------|--------|
| eLCID | | | Byte 2 |

FIG. 7

| Second field | R | R | R | R | R | Byte 1 |
|--------------|---|---|---|---|---|--------|

FIG. 8

| Second field | R | R | R | R | R | R | Byte 1 |
|--------------|---|---|---|---|---|---|--------|

FIG. 9

| Second field | R | R | R | R | R | R | R | Byte 1 |
|--------------|---|---|---|---|---|---|---|--------|

FIG. 10

COMMUNICATION METHOD AND APPARATUS, AND READABLE STORAGE MEDIUM

CROSS-REFERENCE TO RELATED APPLICATIONS

This application is a continuation of International Application No. PCT/CN2020/107423, filed on Aug. 6, 2020, the disclosure of which is hereby incorporated by reference in its entirety.

TECHNICAL FIELD

This application relates to communication technologies, and in particular, to a communication method and apparatus, and a readable storage medium.

BACKGROUND

Communication manners in a vehicle-to-everything (vehicle-to-everything, V2X) system are collectively referred to as V2X communication (X represents anything). For example, V2X communication may include vehicle-to-vehicle (vehicle-to-vehicle, V2V) communication, vehicle-to-infrastructure (vehicle-to-infrastructure, V2I) communication, vehicle-to-pedestrian (vehicle-to-pedestrian, V2P) communication, vehicle-to-network (vehicle-to-network, V2N) communication, or the like. Communication between terminal devices in the V2X system is widely referred to as sidelink (sidelink, SL) communication.

In a communication mode of SL communication, a network device configures a resource pool, and a terminal device performs resource sensing and resource selection. Therefore, how the terminal device implements resource sensing and resource selection is a problem worth studying.

SUMMARY

Embodiments of this application provide a communication method and apparatus, and a readable storage medium, so that a terminal device implements resource sensing and resource selection.

According to a first aspect, an embodiment of this application provides a communication method. The method includes:

A first device sends information about a first priority and a second priority to a second device. The first priority is used to assist the second device in selecting a resource for sidelink transmission, the information about the first priority is carried in sidelink control information SCI and/or a medium access control control element MAC CE, and the second priority is a physical layer priority of the first device.

In the method, the first device sends the information about the first priority and the second priority to the second device, and the information about the first priority is used to assist the second device in selecting the resource for sidelink transmission. The second device may further select, based on the information about the first priority, the resource for sidelink transmission. In this embodiment, the first device assists the second device in selecting the resource for sidelink transmission. A resource is selected through assistance or coordination. Therefore, a surrounding environment can be sensed from more angles. This can overcome a sending resource conflict scenario caused by a hidden node, an IBE problem deterioration scenario caused by near-far effect, and a scenario of additionally receiving interference information near UE.

In addition, the information about the first priority is carried in the SCI or the MAC CE, to help another device in a sidelink communication system perform subsequent processes such as resource sensing, resource selection, and preemption based on the two priorities. Specifically, in comparison with a non-assistance-based resource selection mechanism, an assistance-based request and assistance-based resource sending require additional time frequency resources. Therefore, an assistance device is expected to serve a higher-value target or a device with a higher service priority. In this embodiment, a signaling design in which the SCI or the MAC CE is used to carry the information about the first priority is introduced. By using the dynamic indication design, another device can use more information during determining in processes such as resource sensing, resource selection, and preemption. For example, a device assisting in a higher service priority obtains more resources for sidelink transmission, or a device assisting in a lower service priority obtains fewer resources for sidelink transmission.

In a possible implementation, the first device further sends first information to the second device, and the first information includes any one of the following:

a resource set for sidelink transmission determined by the first device, and information used by the first device to select a sidelink transmission resource.

In a possible implementation, the second priority is a preset value, or the second priority is a priority in a preset priority list, and the preset priority list includes a plurality of priorities.

In the possible implementation, the second priority is a fixed value or a value from a priority list. The processing manner is simple and direct, and can reduce processing complexity of the device.

In a possible implementation, the second priority is related to the first priority.

In the possible implementation, the second priority is related to the first priority, and the second priority may be obtained based on a correlation between the two priorities. In this manner, the information about the first priority and the second priority may be indicated by using fewer signaling overheads.

In a possible implementation, the second priority is related to a range of the first priority.

In a possible implementation, the second priority is a sum of the first priority and a first difference, or the second priority is a difference between the first priority and a first difference.

In the possible implementation, the first difference is indicated by using radio resource control RRC signaling, or the first difference is a pre-configured value. The first difference may be a positive number or a negative number.

In a possible implementation, the second priority is a higher priority between the first priority and a logical channel priority, and the logical channel priority is a highest priority in logical channel priorities corresponding to data of a physical sidelink shared channel PSSCH.

In a possible implementation, the information about the first priority is carried in a first sub-protocol data unit, the first sub-protocol data unit is a medium access control sub-protocol data unit, the first sub-protocol data unit includes a first subheader and a first control element, the first subheader includes a first field, and the first field indicates a logical channel number.

In the possible implementation, the information about the first priority can be dynamically indicated. In addition, because the MAC CE can carry a large amount of information, the MAC CE may be used to carry the information about the first priority, and the MAC CE may be used to carry other information, for example, geographical location information of the second device.

In a possible implementation, a first value of the first field in the first subheader indicates that the information about the first priority is transmitted.

In the possible implementation, the first subheader includes M bits, M is an integer multiple of 8, the first field occupies N bits in the first subheader, and N is an integer greater than or equal to 6.

In a possible implementation, the first control element includes a second field, and the second field indicates the information about the first priority.

In the possible implementation, the second field includes three bits, two bits, one bit, or four bits.

In a possible implementation, the first control element further includes a third field, and the third field indicates the geographical location information of the second device.

In a possible implementation, the information about the first priority is carried in the SCI.

In a possible implementation, SCI of a control channel includes a fourth field, the fourth field indicates the first priority, or the fourth field indicates a second difference corresponding to the first priority, and the second difference is a difference between the first priority and the second priority.

In a possible implementation, SCI of a data channel includes a fifth field, and the fifth field indicates the first priority or a second difference corresponding to the first priority.

In a possible implementation, the SCI of the data channel includes SCI2-A, SCI2-B, or SCI other than SCI2-A and SCI2-B.

In a possible implementation, the first priority is a sum of the second priority and the second difference, or the first priority is a difference between the second priority and the second difference, and the second difference may be a positive number or a negative number.

The information about the first priority is carried in first-order SCI, so that the information about the first priority can be more flexibly and dynamically indicated. This helps another device decode the information about the first priority during resource sensing, and further provides more reference information for determining in resource selection and preemption.

Because a size of the first-order SCI is limited, the information about the first priority may alternatively be carried in second-order SCI. In this manner, the information about the first priority can also be flexibly and dynamically indicated. The second device may demodulate the second-order SCI after demodulating the first-order SCI, to obtain the information about the first priority. When the information about the first priority is indicated by using second-order SCI in a new format, a "second-order SCI format" field in the first-order SCI may indicate the information about the first priority indicated by the second-order SCI.

According to a second aspect, an embodiment of this application provides a communication method. The method includes:

A second device receives information about a first priority and a second priority from a first device. The first priority is used to assist the second device in selecting a resource for sidelink transmission, the information about the first priority is carried in SCI and/or a MAC CE, and the second priority is a physical layer priority of the first device. The second device selects, based on the information about the first priority, a resource for sidelink transmission.

In the method, the first device sends the information about the first priority and the second priority to the second device. The information about the first priority is used to assist the second device in selecting the resource for sidelink transmission. Therefore, the second device may further select, based on the information about the first priority, the resource for sidelink transmission, to implement resource selection of the second device.

In a possible implementation, the second device further receives first information from the first device, and the first information includes any one of the following:

a resource set for sidelink transmission determined by the first device, and information used by the first device to select a sidelink transmission resource.

In a possible implementation, the second priority is a preset value, or the second priority is a priority in a preset priority list, and the preset priority list includes a plurality of priorities.

In a possible implementation, the second priority is related to the first priority.

In a possible implementation, the second priority is related to a range of the first priority.

In a possible implementation, the second priority is a sum of the first priority and a first difference, or the second priority is a difference between the first priority and a first difference.

In the possible implementation, the first difference is indicated by using RRC signaling, or the first difference is a pre-configured value. The first difference may be a positive number or a negative number.

In a possible implementation, the second priority is a higher priority between the first priority and a logical channel priority, and the logical channel priority is a highest priority in logical channel priorities corresponding to data of a PSSCH.

In a possible implementation, the information about the first priority is carried in a first sub-protocol data unit, the first sub-protocol data unit is a medium access control sub-protocol data unit, the first sub-protocol data unit includes a first subheader and a first control element, the first subheader includes a first field, and the first field indicates a logical channel number.

In a possible implementation, a first value of the first field in the first subheader indicates that the information about the first priority is transmitted.

In the possible implementation, the first subheader includes M bits, M is an integer multiple of 8, the first field occupies N bits in the first subheader, and N is an integer greater than or equal to 6.

In a possible implementation, the first control element includes a second field, and the second field indicates the information about the first priority.

In the possible implementation, the second field includes three bits, two bits, one bit, or four bits.

In a possible implementation, the first control element further includes a third field, and the third field indicates the geographical location information of the second device.

In a possible implementation, the information about the first priority is carried in the SCI.

In a possible implementation, SCI of a control channel includes a fourth field, the fourth field indicates the first priority, or the fourth field indicates a second difference corresponding to the first priority, and the second difference is a difference between the first priority and the second priority.

In a possible implementation, SCI of a data channel includes a fifth field, and the fifth field indicates the first priority or a second difference corresponding to the first priority.

In a possible implementation, the SCI of the data channel includes SCI2-A, SCI2-B, or SCI other than SCI2-A and SCI2-B.

In a possible implementation, the first priority is a sum of the second priority and the second difference, or the first priority is a difference between the second priority and the second difference, and the second difference may be a positive number or a negative number.

According to a third aspect, an embodiment of this application provides a communication apparatus, including a processing module and a sending module.

The processing module is configured to send information about a first priority and a second priority to a second device by using the sending module.

The first priority is used to assist the second device in selecting a resource for sidelink transmission, the information about the first priority is carried in SCI and/or a MAC CE, and the second priority is a physical layer priority of a first device.

In a possible implementation, the processing module is further configured to send first information to the second device by using the sending module, and the first information includes any one of the following:

a resource set for sidelink transmission determined by the first device, and information used by the first device to select a sidelink transmission resource.

In a possible implementation, the second priority is a preset value, or the second priority is a priority in a preset priority list, and the preset priority list includes a plurality of priorities.

In a possible implementation, the second priority is related to the first priority.

In a possible implementation, the second priority is related to a range of the first priority.

In a possible implementation, the second priority is a sum of the first priority and a first difference, or the second priority is a difference between the first priority and a first difference.

In the possible implementation, the first difference is indicated by using RRC signaling, or the first difference is a pre-configured value. The first difference may be a positive number or a negative number.

In a possible implementation, the second priority is a higher priority between the first priority and a logical channel priority, and the logical channel priority is a highest priority in logical channel priorities corresponding to data of a PSSCH.

In a possible implementation, the information about the first priority is carried in a first sub-protocol data unit, the first sub-protocol data unit is a medium access control sub-protocol data unit, the first sub-protocol data unit includes a first subheader and a first control element, the first subheader includes a first field, and the first field indicates a logical channel number.

In a possible implementation, a first value of the first field in the first subheader indicates that the information about the first priority is transmitted.

In the possible implementation, the first subheader includes M bits, M is an integer multiple of 8, the first field occupies N bits in the first subheader, and N is an integer greater than or equal to 6.

In a possible implementation, the first control element includes a second field, and the second field indicates the information about the first priority.

In the possible implementation, the second field includes three bits, two bits, one bit, or four bits.

In a possible implementation, the first control element further includes a third field, and the third field indicates the geographical location information of the second device.

In a possible implementation, the information about the first priority is carried in the SCI.

In a possible implementation, SCI of a control channel includes a fourth field, the fourth field indicates the first priority, or the fourth field indicates a second difference corresponding to the first priority, and the second difference is a difference between the first priority and the second priority.

In a possible implementation, SCI of a data channel includes a fifth field, and the fifth field indicates the first priority or a second difference corresponding to the first priority.

In a possible implementation, the SCI of the data channel includes SCI2-A, SCI2-B, or SCI other than SCI2-A and SCI2-B.

In a possible implementation, the first priority is a sum of the second priority and the second difference, or the first priority is a difference between the second priority and the second difference, and the second difference may be a positive number or a negative number.

According to a fourth aspect, an embodiment of this application provides a communication apparatus, including:

a receiving module, configured to receive information about a first priority and a second priority from a first device, where the first priority is used to assist a second device in selecting a resource for sidelink transmission, the information about the first priority is carried in SCI and/or a MAC CE, and the second priority is a physical layer priority of the first device; and a processing module, configured to select, based on the information about the first priority, a resource for sidelink transmission.

In a possible implementation, the receiving module is further configured to receive first information from the first device, and the first information includes any one of the following:

a resource set for sidelink transmission determined by the first device, and information used by the first device to select a sidelink transmission resource.

In a possible implementation, the second priority is a preset value, or the second priority is a priority in a preset priority list, and the preset priority list includes a plurality of priorities.

In a possible implementation, the second priority is related to the first priority.

In a possible implementation, the second priority is related to a range of the first priority.

In a possible implementation, the second priority is a sum of the first priority and a first difference, or the second priority is a difference between the first priority and a first difference.

In the possible implementation, the first difference is indicated by using RRC signaling, or the first difference is a pre-configured value. The first difference may be a positive number or a negative number.

In a possible implementation, the second priority is a higher priority between the first priority and a logical channel priority, and the logical channel priority is a highest priority in logical channel priorities corresponding to data of a PSSCH.

In a possible implementation, the information about the first priority is carried in a first sub-protocol data unit, the first sub-protocol data unit is a medium access control sub-protocol data unit, the first sub-protocol data unit includes a first subheader and a first control element, the first subheader includes a first field, and the first field indicates a logical channel number.

In a possible implementation, a first value of the first field in the first subheader indicates that the information about the first priority is transmitted.

In the possible implementation, the first subheader includes M bits, M is an integer multiple of 8, the first field occupies N bits in the first subheader, and N is an integer greater than or equal to 6.

In a possible implementation, the first control element includes a second field, and the second field indicates the information about the first priority.

In the possible implementation, the second field includes three bits, two bits, one bit, or four bits.

In a possible implementation, the first control element further includes a third field, and the third field indicates the geographical location information of the second device.

In a possible implementation, the information about the first priority is carried in the SCI.

In a possible implementation, SCI of a control channel includes a fourth field, the fourth field indicates the first priority, or the fourth field indicates a second difference corresponding to the first priority, and the second difference is a difference between the first priority and the second priority.

In a possible implementation, SCI of a data channel includes a fifth field, and the fifth field indicates the first priority or a second difference corresponding to the first priority.

In a possible implementation, the SCI of the data channel includes SCI2-A, SCI2-B, or SCI other than SCI2-A and SCI2-B.

In a possible implementation, the first priority is a sum of the second priority and the second difference, or the first priority is a difference between the second priority and the second difference, and the second difference may be a positive number or a negative number.

According to a fifth aspect, an embodiment of this application provides a communication apparatus, including a processor and a communication interface.

The communication interface is configured to implement connection and communication between the communication apparatus and a peripheral.

The processor is configured to implement the method in the first aspect or the second aspect.

In a possible design, the communication apparatus further includes a memory.

The memory is configured to store a computer program. The processor executes the computer program stored in the memory, to enable the apparatus to perform the method in the first aspect or the second aspect.

In a possible design, the communication apparatus further includes a transceiver.

The transceiver is configured to send and receive a message.

According to a sixth aspect, an embodiment of this application provides a computer-readable storage medium.

The computer-readable storage medium stores a computer program, and when the computer program is run, the method in the first aspect or the second aspect is implemented.

According to a seventh aspect, an embodiment of this application provides a chip, including a processor and an interface.

The processor is configured to read instructions, to implement the information processing method in the first aspect or the second aspect.

According to an eighth aspect, an embodiment of this application provides a computer program product. The computer program product includes computer program code. When the computer program code is executed by a computer, the computer is enabled to perform the method in the first aspect or the second aspect.

According to a ninth aspect, an embodiment of this application provides a communication system, including the communication apparatus in the fifth aspect.

DESCRIPTION OF DRAWINGS

Figures 6, 7, 8, 9, 10:
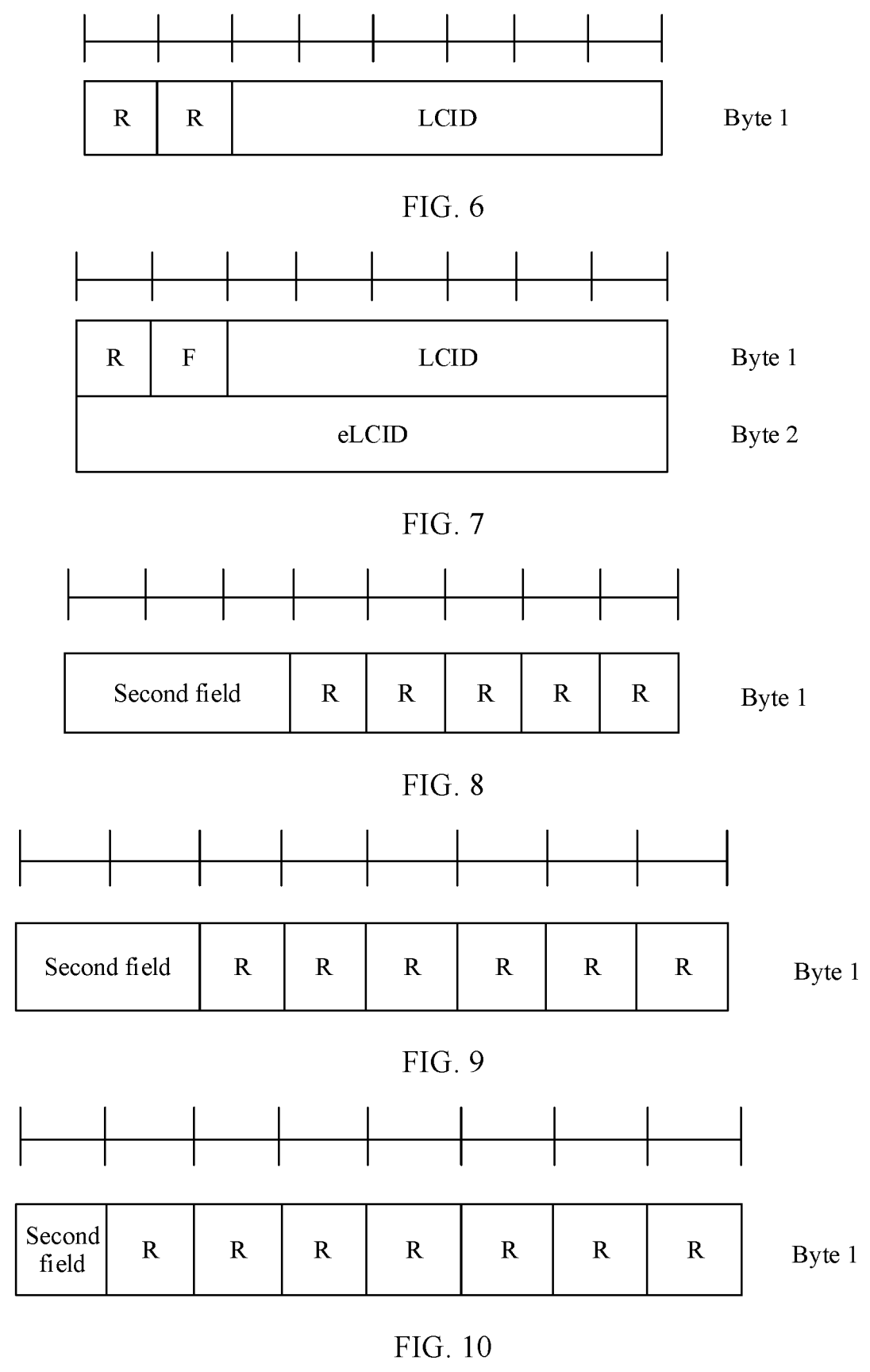

FIG. 6 is a schematic diagram of a structure of an R/LCID subheader;

FIG. 7 is a schematic diagram of another structure of an R/LCID subheader;

FIG. 8 is a schematic diagram of a structure of a first control element;

FIG. 9 is a schematic diagram of another structure of a first control element;

FIG. 10 is a schematic diagram of still another structure of a first control element;

DESCRIPTION OF EMBODIMENTS

This application is applied to SL communication, and a V2X communication system is a typical application scenario of SL communication. For ease of understanding the technical solutions in embodiments of this application by a person skilled in the art, the following embodiments provide descriptions by using the V2X communication system as an example. However, it should be understood that this cannot be construed as a limitation on this application. The technical solutions in this application may further be applied to another communication system based on SL communication.

Figure 1:
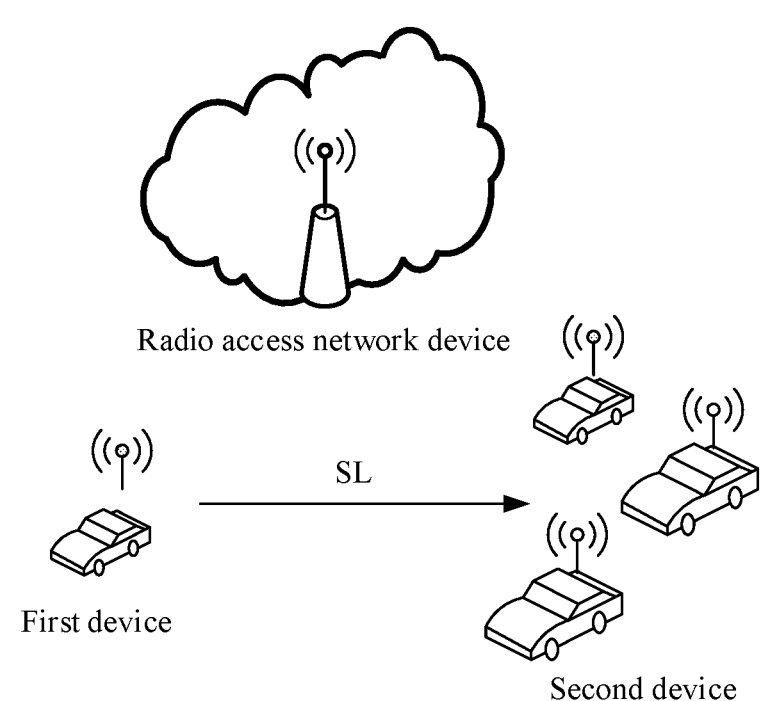
FIG. 1 is a schematic diagram of a V2X communication scenario.

FIG. 1 is a schematic diagram of a V2X communication scenario. As shown in FIG. 1, a first device communicates with a second device through an SL. The sidelink is a secondary link in a V2X network. In addition to the secondary link, the V2X network further includes an uplink (uplink) and a downlink (downlink).

For example, V2X communication includes vehicle-to-vehicle (Vehicle-to-Vehicle, V2V) communication, vehicle-to-infrastructure (Vehicle-to-Infrastructure, V2I) communication, vehicle-to-people (Vehicle-to-People, V2P) communication, vehicle-to-application server (Vehicle-to-Network, V2N) communication, and the like. In FIG. 1, V2V communication in which both the first device and the second device are vehicles is used as an example for description. A specific V2X communication scenario is not limited in this embodiment of this application. For example, communication between the first device and the second device may be communication between vehicle-mounted devices, between a roadside unit (Roadside Unit, RSU) and a vehicle-mounted device and/or a network device (for example, a base station device), between a network device (for example, a base station device) and a vehicle-mounted device and/or an RSU, or the like. The network device may be an LTE base station device, an NR base station device, or a base station in a subsequent evolved system.

It may be understood that specific forms of the first device and the second device are not limited in this embodiment of this application. This is merely an example for description herein. For example, a radio access network device in FIG. 1 may be a base station or a device in a network that provides radio access. The base station may be an evolved NodeB (eNB) in LTE (Long Term Evolution) or a base station in an NR network. The base station in NR may include a new radio NodeB (NR NodeB, gNB), a next-generation evolved NodeB (NG-eNB), a gNB separated from a central unit (central unit, CU) and a distributed unit (distributed unit, DU), a transmission/reception point (transmission/reception point, TRP), a transmission point (transmission point, TP), an access point (access point, AP) in a wireless fidelity (Wireless Fidelity, Wi-Fi) network, or another node.

It may be understood that a communication method provided in this application is not only applicable to the sidelink shown in FIG. 1, but also applicable to a cellular link. A scenario to which the communication method is applicable is not limited in this embodiment of this application. This is merely an example for description herein. The first device and the second device in this embodiment of this application are communication devices, and the communication device may be a terminal device, or may be a network device. When the first device is a network device, the sidelink may be a link between base stations, for example, a link between macro base stations, a link between a macro base station and a small cell, a link between a primary base station and a secondary base station, a link between primary base stations, or a link between secondary base stations. This is not limited in this embodiment of this application.

The following describes an interaction processing procedure between the first device and the second device. It should be noted that in this application, there may be one or more first devices. There may be one or more second devices.

Figure 2:
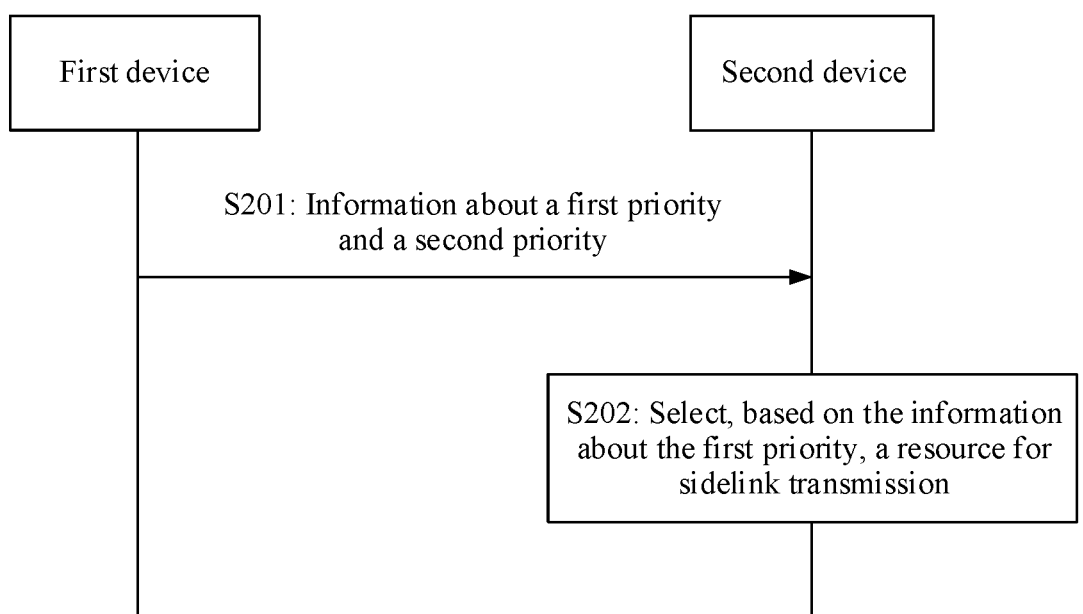
FIG. 2 is an interaction flowchart of a communication method according to an embodiment of this application.

FIG. 2 is an interaction flowchart of a communication method according to an embodiment of this application. As shown in FIG. 2, an interaction process between a first device and a second device includes the following steps.

S201: The first device sends information about a first priority and a second priority to the second device.

Correspondingly, the second device receives the information about the first priority and the second priority.

The first priority is used to assist the second device in selecting a resource for sidelink transmission, and the information about the first priority may be carried in sidelink control information (sidelink control information, SCI) and/or a medium access control control element (medium access control control element, MAC CE).

It should be understood that the information about the first priority may be the first priority or information associated with the first priority. When the information about the first priority is information associated with the first priority, the information about the first priority may indicate the first priority. After receiving the information about the first priority, the second device may obtain the first priority based on the information about the first priority, and further select, based on the first priority, the resource for sidelink transmission.

Optionally, that the first device sends the information about the first priority and the second priority to the second device may occur in a phase in which the first device initiates a coordination request to the second device, or in a phase in which the first device assists the second device in resource selection.

In one case, the first device assists the second device in resource selection.

In the phase, optionally, the first priority may be a priority used by the first device to assist the second device in resource selection, a service priority of the second device, a physical layer priority of the second device, or a priority corresponding to a physical sidelink shared channel (physical sidelink shared channel, PSSCH) sent by the second device to a third device.

The second priority may be a service priority sent by the first device to the second device, a priority carried in the SCI sent by the first device to the second device, a priority corresponding to a PSSCH sent by the first device to the second device, a priority corresponding to a logical channel sent by the first device to the second device, a highest priority in priorities corresponding to a logical channel sent by the first device to the second device, a priority corresponding to a service of the first device, or a priority used by the first device for resource selection of the first device.

In another case, the first device initiates a coordination request to the second device.

In the phase, optionally, the first priority may be a priority used by the first device to request the second device to assist in resource selection, a service priority sent by the second device to the third device, a physical layer priority sent by the second device to the third device, or a priority corresponding to a PSSCH sent by the second device to the third device.

The second priority may be a service priority sent by the first device to the second device, a priority carried in the SCI sent by the first device to the second device, a priority corresponding to a PSSCH sent by the first device to the second device, a priority corresponding to a logical channel sent by the first device to the second device, a highest priority in priorities corresponding to a logical channel sent by the first device to the second device, or a priority of a resource that is selected by the first device and that is for sidelink transmission to the third device.

Optionally, the information about the first priority and the second priority may be transmitted in a data transport block (transport block, TB). Specifically, the second priority is carried in SCI of a PSCCH, and the information about the first priority is carried in the SCI or the MAC CE.

Figure 3:
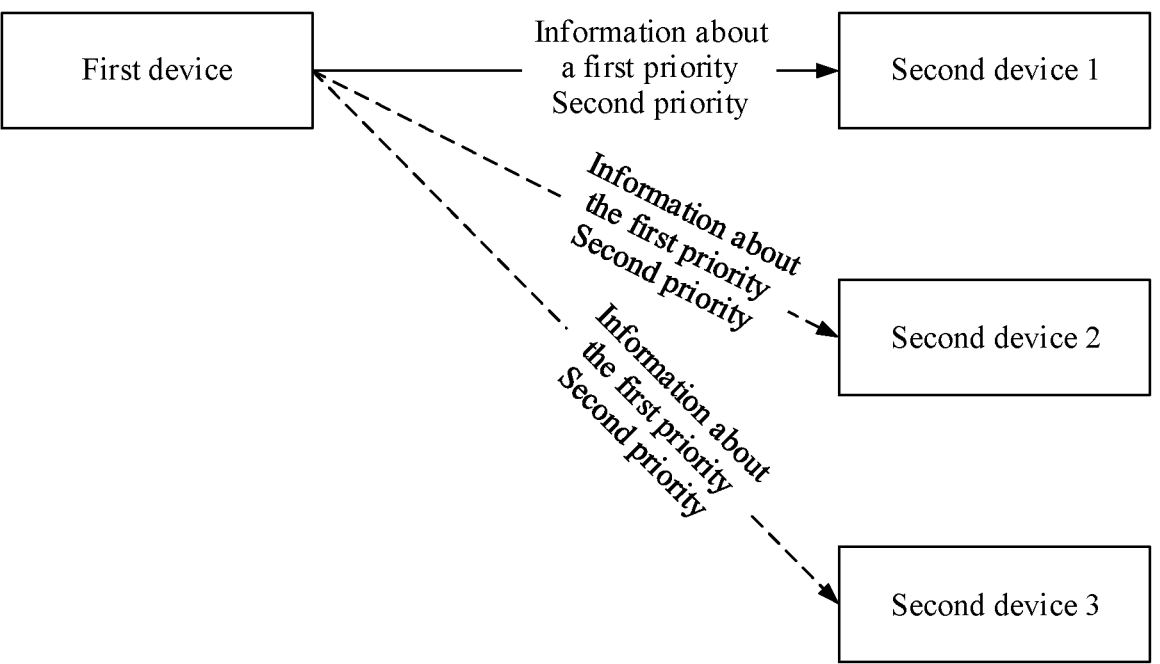
FIG. 3 is a schematic diagram in which a first device sends information about a first priority and a second priority to a second device.

As described above, there may be one or more first devices. There may be one or more second devices. FIG. 3 is a schematic diagram in which the first device sends the information about the first priority and the second priority to the second device. As shown in FIG. 3, the second device may be, for example, a second device 1, and the first device sends the information about the first priority and the second priority to the second device 1. This manner may be applied to, for example, a unicast scenario. In addition, as shown in FIG. 3, for example, the second device may include three devices: a second device 1, a second device 2, and a second device 3. The first device sends the information about the first priority and the second priority to each second device. This manner may be applied to a multicast scenario or a broadcast scenario. The first device may set a first priority, and when a service priority of the second device is higher than the first priority, a resource set sent by the first device may be used. Refer to FIG. 3. Both the information about the first priority and the second priority may be carried in the SCI, or the second priority is carried in the SCI, and the information about the first priority is carried in the MAC CE.

S202: The second device selects, based on the information about the first priority, a resource for sidelink transmission.

In different phases or a data transmission phase, the first device may represent different devices, and the second device may also represent different devices. Correspondingly, for example, when the second device selects, based on the information about the first priority, the resource for sidelink transmission, the second device may assist, based on the information about the first priority, the first device in performing resource sensing and resource selection, or may select, based on the information about the first priority, the resource from the resource set provided by the first device.

In this embodiment, the first device sends the information about the first priority and the second priority to the second device, and the information about the first priority is used to assist the second device in selecting the resource for sidelink transmission. The second device may further select, based on the information about the first priority, the resource for sidelink transmission. In this embodiment, the first device assists the second device in selecting the resource for sidelink transmission. A resource is selected through assistance or coordination. Therefore, a surrounding environment can be sensed from more angles. This can overcome a sending resource conflict scenario caused by a hidden node, an IBE problem deterioration scenario caused by near-far effect, and a scenario of additionally receiving interference information near UE.

In addition, the information about the first priority is carried in the SCI or the MAC CE, to help another device in a sidelink communication system perform subsequent processes such as resource sensing, resource selection, and preemption based on the two priorities. Specifically, in comparison with a non-assistance-based resource selection mechanism, an assistance-based request and assistance-based resource sending require additional time frequency resources. Therefore, an assistance device is expected to serve a higher-value target or a device with a higher service priority. In this embodiment, a signaling design in which the SCI or the MAC CE is used to carry the information about the first priority is introduced. By using the dynamic indication design, another device can use more information during determining in processes such as resource sensing, resource selection, and preemption. For example, a device assisting in a higher service priority obtains more resources for sidelink transmission, or a device assisting in a lower service priority obtains fewer resources for sidelink transmission.

The interaction between the first device and the second device may be applied to a process in which two or more devices coordinate to perform resource sensing and resource selection. The following describes in detail the interaction process between the first device and the second device by using an example in which two terminal devices, namely, a terminal device A and a terminal device B, coordinate to perform resource sensing and resource selection.

It should be understood that resources described in the following embodiments of this application are all resources for sidelink transmission.

Figure 4:
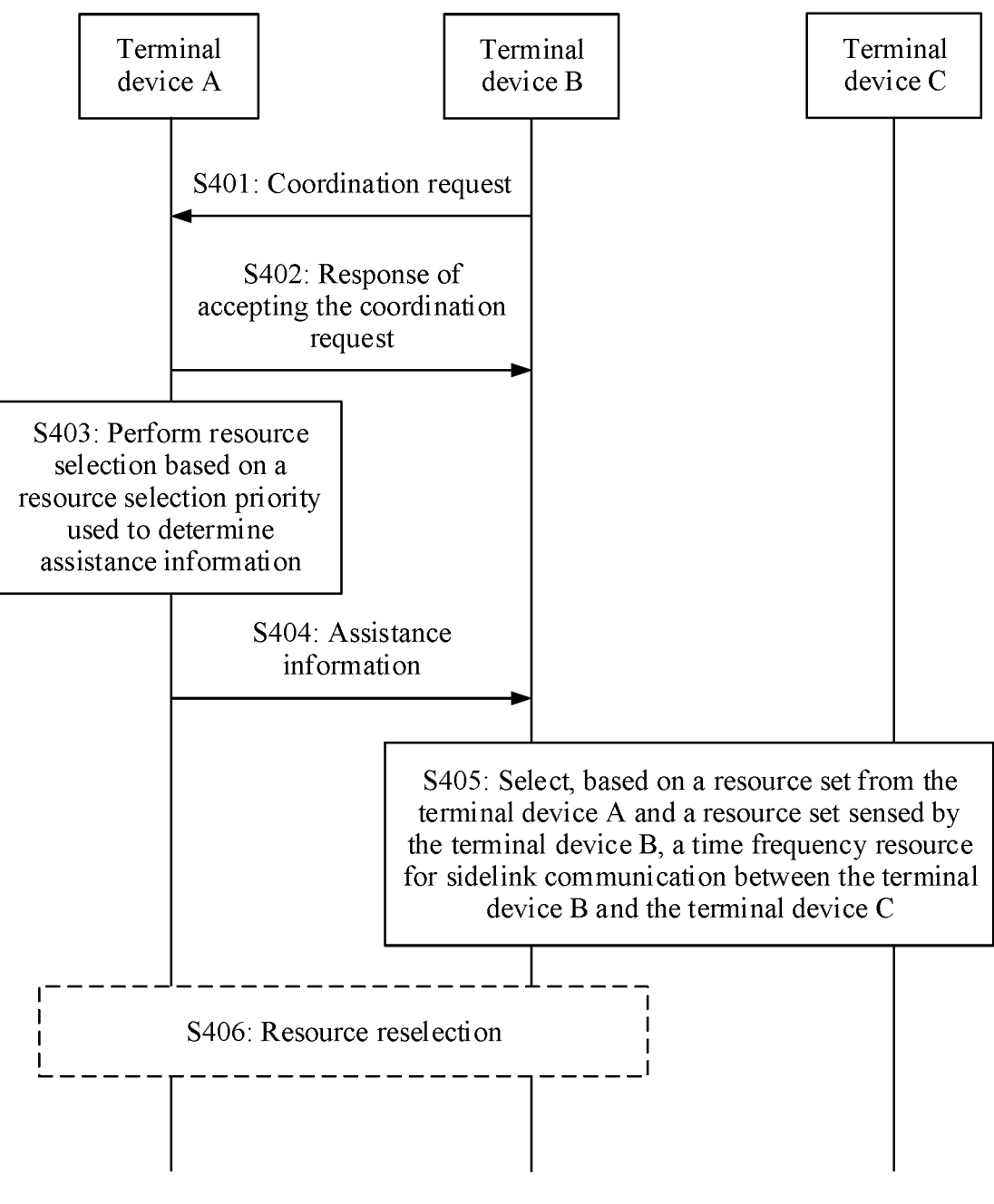
FIG. 4 is an interaction flowchart of an example in which a terminal device A coordinates with a terminal device B to perform resource sensing and resource selection.

FIG. 4 is an interaction flowchart of an example in which the terminal device A coordinates with the terminal device B to perform resource sensing and resource selection. As shown in FIG. 4, an interaction process between the terminal device A and the terminal device B includes the following steps.

S401: The terminal device B sends a coordination request to the terminal device A. The coordination request is used to request the terminal device A to sense a resource for the terminal device B.

It should be noted that when the terminal device A coordinates with the terminal device B to perform resource sensing and resource selection, coordination may also be referred to as assistance. Assistance may indicate that the terminal device A recommends the terminal device B to use some resources, and the terminal device B determines resources to be used. Alternatively, assistance may indicate that the terminal device A specifies that the terminal device B uses some resources, and the terminal device B uses the resources based on the indication of the terminal device A, and does not perform determining independently.

Specifically, the terminal device B adds information about a first priority and a second priority to the coordination request. The information about the first priority is used to assist the terminal device A in selecting a resource for sidelink transmission, and the second priority is a physical layer priority of the terminal device B.

Optionally, the coordination request may include first information, and the first information includes information about selecting a resource for sidelink transmission by the terminal device B. For example, the coordination request may include a parameter used by the terminal device B to select the resource for sidelink transmission.

S402: If the terminal device A can sense a resource for the terminal device B, the terminal device A sends, to the terminal device B, a response of accepting the collaboration request.

In step S401 and step S402, the terminal device B may serve as the first device, and the terminal device A may serve as the second device. After receiving the coordination request and sending the response of accepting the collaboration request, the terminal device A may select, based on the information about the first priority, the resource for sidelink transmission.

Optionally, in step S401, the terminal device B may further send geographical location information of the terminal device A to the terminal device A, to request a second device, namely, the terminal device A, at a specific geographical location.

In step S401 and step S402, coordinated resource sensing and selection are triggered by the terminal device B. In another possible manner, coordinated resource sensing and selection of the terminal device A and the terminal device B may alternatively be performed based on a non-triggering mechanism. In this manner, step S401 and step S402 do not need to be performed, and step S403 is directly performed.

It should be noted that, in one case, if coordinated resource sensing and selection are performed based on a triggering manner, a resource selection priority that is used by the terminal device A to determine assistance information in step S403 may be obtained based on the first priority indicated by the coordination request of the terminal device B in step S401. It is assumed that first priorities indicated by coordination requests of a plurality of terminal devices B are $\{P_{A1}, P_{A2}, P_{A3} \ldots \}$. In a unicast scenario, the resource selection priority that is used by the terminal device A to determine the assistance information in step S403 may be equal to $P_{A1}$ In a multicast scenario, the resource selection priority used by the terminal device A to determine the assistance information may be calculated in the following two manners:

Manner 1: $P_A$=max $\{P_{A1}, P_{A2}, P_{A3} \ldots \}$
Manner 2: $P_A$=mean $\{P_{A1}, P_{A2}, P_{A3} \ldots \}$ In another case, if coordinated resource sensing and selection are performed based on a non-triggering manner, a resource selection priority that is used by the terminal device A to determine assistance information in step S403 may be determined by the terminal device A.

S403: The terminal device A performs resource selection based on the resource selection priority used to determine the assistance information.

It should be understood that the terminal device A may perform resource selection based on the resource selection priority used to determine the assistance information, a location and a length of a resource sensing window, a quantity of resource selection frequency domain sub-bandwidths, a transmission period of the terminal device B, resource pool information, and the like.

After resource selection, the terminal device A may obtain a sensed resource set for resource selection of the terminal device A and the terminal device B.

S404: The terminal device A sends the assistance information to the terminal device B.

The assistance information may include the resource set that is for sidelink transmission and that is determined by the terminal device A. It should be noted that the resource set included in the assistance information does not include a resource to be used by the terminal device A for transmission. Optionally, the resource set included in the assistance information may be a resource set that the terminal device A recommends the terminal device B to use, or may be a resource set that the terminal device A does not recommend the terminal device B to use.

In addition, the terminal device A further sends the information about the first priority and the second priority to the terminal device B. The information about the first priority is used to assist the terminal device B in selecting the resource for sidelink transmission, and the second priority is a physical layer priority of the terminal device A.

Correspondingly, the terminal device B receives the assistance information, the information about the first priority, and the second priority.

Optionally, in step S404, the terminal device A may further send geographical location information of the terminal device B to the terminal device B, to assist the second device, namely, the terminal device B, at a specific geographical location.

In step S403 and step S404, the terminal device A may serve as the first device, and the terminal device B may serve as the second device. The assistance information may be used as the first information. Specifically, when sending the assistance information to the terminal device B, the terminal device A may also send the information about the first priority and the second priority. The information about the first priority is used to assist the terminal device B in selecting the resource for sidelink transmission, and the second priority is a physical layer priority of the terminal device A. After receiving the assistance information, the information about the first priority, and the second priority, the terminal device B may select, based on the information about the first priority, the resource for sidelink transmission.

It should be understood that, in the phase corresponding to step S401 and step S402 and the phase corresponding to step S403 and step S404, meanings represented by the first device are different, and meanings represented by the second device are also different. Correspondingly, meanings represented by the information about the first priority are different, and meanings represented by the second priority are also different.

S405: The terminal device B selects, based on the resource set from the terminal device A and the resource set sensed by the terminal device B, a time frequency resource for sidelink communication between the terminal device B and a terminal device C.

Sidelink communication between the terminal device B and the terminal device C may include an initial transmission and several retransmissions. The terminal device B may determine, based on a hybrid automatic repeat request (hybrid automatic repeat request, HARQ) response of the terminal device C, whether to perform retransmission.

S406: If assistance resource reselection is supported, the terminal device B may repeatedly perform step S401 to step S405, to perform resource reselection. A specific processing procedure is not described again.

As described above, the first device sends the information about the first priority and the second priority to the second device. Before sending the second priority, the first device may first determine the second priority. The following describes several optional manners of determining the second priority.

In a first optional manner, the second priority is a preset value.

For example, the second priority is a preset value M, where M is an integer greater than or equal to 1 and less than or equal to 8, or an integer greater than or equal to 0 and less than or equal to 7. The value range is also applicable to the first priority.

It should be understood that, in this embodiment of this application, the second priority is represented by a value, and the value is opposite to a level actually indicated by the second priority. A larger value of the second priority indicates a lower level of the second priority. For example, it is assumed that the value range of the priority is an integer from 1 to 8. When the value of the second priority is 1, it indicates that the second priority is a highest priority, and when the value of the second priority is 8, it indicates that the second priority is a lowest priority.

It should be understood that the explanations and descriptions are also applicable to the first priority. In other words, a larger value of the first priority indicates a higher level of the first priority, and a smaller value of the first priority indicates a lower level of the first priority.

In a second optional manner, the second priority is a priority in a preset priority list.

Optionally, the preset priority list may include a plurality of priorities, and the first device may select one priority from the plurality of priorities as the second priority.

For example, each priority in the preset priority list may be an integer greater than or equal to 1 and less than or equal to 8. In an example, the priority list may be {1, 3, 5, 7}. In another example, the priority list may be {2, 4, 6, 8}. For example, the priority list is {1, 3, 5, 7}, and only two bits are required to represent any priority in the priority list. This can reduce signaling overheads.

In the two manners, the second priority is a fixed value or a value from a priority list. The processing manner is simple and direct, and can reduce processing complexity of the device.

In a third optional manner, the second priority is related to the first priority.

The manner may be any one of the following three examples.

1. Example 1

In a first example of the optional manner, the second priority may be related to a range of the first priority. The range of the first priority may correspond to the value of the second priority.

For example, it is assumed that a value range of the priority is an integer from 1 to 8. The range of the first priority is {1, 2, 3, 4}, and the second priority may be 4. The range of the first priority is {5, 6, 7, 8}, and the second priority may be 8. Only one bit is required to represent any priority in the priority list. This can reduce signaling overheads. Alternatively, each value of the second priority corresponds to four values of the first priority, and only two bits are required to represent any priority in the priority list. This can reduce signaling overheads.

For another example, it is assumed that a value range of the priority is an integer from 1 to 8. The range of the first priority is {1, 2, 3, 4}, and the second priority may be 1. The range of the first priority is {5, 6, 7, 8}, and the second priority may be 5. Only one bit is required to represent any priority in the priority list. This can reduce signaling overheads. Alternatively, each value of the second priority corresponds to four values of the first priority, and only two bits are required to represent any priority in the priority list. This can reduce signaling overheads.

2. Example 2

In a second example of the optional manner, the second priority may be a sum of the first priority and a first difference, or the second priority is a difference between the first priority and a first difference.

Optionally, the first difference may be a positive number or a negative number.

In an example, it is assumed that the second priority is $P_i$, the first priority is $P_A$, the first difference is delta1, and the second priority is a sum of the first priority and the first difference. The second priority may be obtained according to the following formula (1):

$$P_i = P_A + \text{delta1} \tag{1}$$

It should be noted that, if the value obtained through calculation according to the formula (1) is greater than a maximum value of the priority, the maximum value of the priority is used as the value of the second priority. For example, a value range of the priority is an integer from 1 to 8. If the value obtained through calculation according to the formula (1) is greater than 8, the value of the second priority may be considered as 8.

If the value obtained through calculation according to the formula (1) is less than a minimum value of the priority, the minimum value of the priority is used as the value of the second priority. For example, a value range of the priority is an integer from 1 to 8. If the value obtained through calculation according to the formula (1) is less than 1, the value of the second priority may be considered as 1.

In another example, it is assumed that the second priority is $P_i$, the first priority is $P_A$, the first difference is delta1, and the second priority is a difference between the first priority and the first difference. The second priority may be obtained according to the following formula (2):

$$P_i = P_A - \text{delta1} \tag{2}$$

It should be noted that, if the value obtained through calculation according to the formula (2) is greater than a maximum value of the priority, the maximum value of the priority is used as the value of the second priority. For example, a value range of the priority is an integer from 1 to 8. If the value obtained through calculation according to the formula (2) is greater than 8, the value of the second priority may be considered as 8.

If the value obtained through calculation according to the formula (2) is less than a minimum value of the priority, the minimum value of the priority is used as the value of the second priority. For example, a value range of the priority is an integer from 1 to 8. If the value obtained through calculation according to the formula (2) is less than 1, the value of the second priority may be considered as 1.

In the second example, the first difference may be indicated by using radio resource control (radio resource control, RRC) signaling, or the first difference may be a pre-configured value. It should be understood that the first difference may be a positive number or a negative number.

3. Example 3

In a third example of the optional manner, the second priority is a higher priority between the first priority and a logical channel priority.

The logical channel priority is a highest priority in logical channel priorities corresponding to data of a PSSCH.

It should be noted that the physical sidelink shared channel may also be referred to as a physical sidelink data channel.

For example, the PSSCH includes eight logical channel priorities. A physical layer priority of the first device is a highest priority in logical channel priorities.

In the third manner, the second priority is related to the first priority, and the second priority may be obtained based on a correlation between the two priorities. In this manner, the information about the first priority and the second priority may be indicated by using fewer signaling overheads.

The foregoing describes several optional manners in which the first device determines the second priority before sending the second priority. In view of this, the following describes a manner in which the first device sends the information about the first priority. It should be understood that the manner of determining the second priority may be implemented in combination with any one of the following manners of sending the information about the first priority.

As described above, the information about the first priority may be carried in the SCI and/or the MAC CE. The following provides descriptions. It should be understood that the first device may select at least one of the SCI or the MAC CE to carry the information about the first priority. When both the SCI and the MAC CE are selected to carry the information about the first priority, the first device adds the information about the first priority to both the SCI and the MAC CE.

First, a manner in which the information about the first priority is carried in the MAC CE is described.

In an optional implementation, the information about the first priority may be carried in a first sub-protocol data unit, and the first sub-protocol data unit is a medium access control sub-protocol data unit (medium access control sub-protocol data unit, MAC subPDU) in a MAC protocol data unit (protocol data unit, PDU). The first sub-protocol data unit includes a first subheader and a first control element. The first subheader includes a first field, and the first field indicates a logical channel number.

A specific value of the first field may indicate that the information about the first priority is transmitted. In addition, a specific field of the first control element may indicate the information about the first priority.

Figure 5:
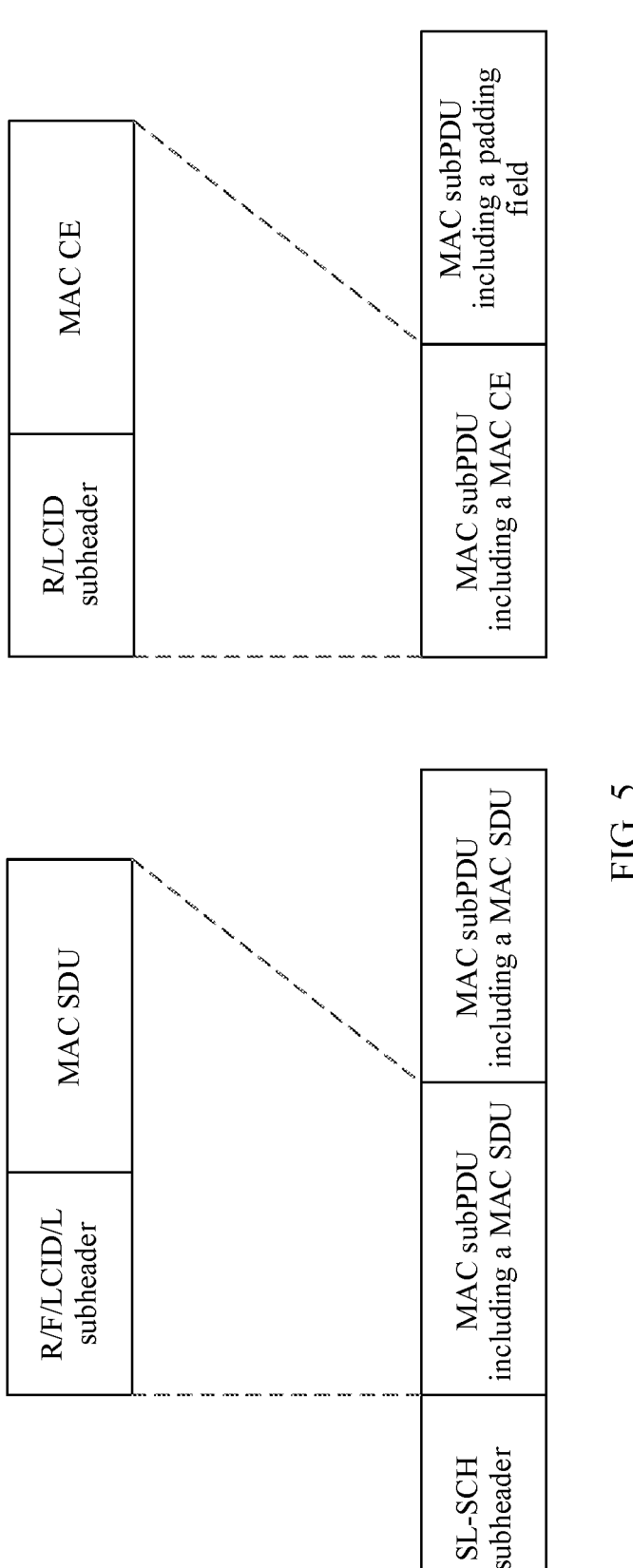
FIG. 5 is a schematic diagram of a structure of a sidelink MAC PDU.

FIG. 5 is a schematic diagram of a structure of a sidelink MAC PDU. As shown in FIG. 5, the MAC PDU includes a sidelink shared channel (sidelink shared channel, SL-SCH) subheader, a MAC subPDU including a MAC SDU, a MAC subPDU including a MAC CE, and a MAC subPDU including a padding (padding) field. Refer to FIG. 5. The MAC subPDU including a MAC SDU includes an R/F/LCID/L subheader and a MAC SDU. The MAC subPDU including a MAC CE includes an R/LCID subheader and a MAC CE.

The R/F/LCID/L subheader includes an R field, an F field, a logical channel identifier (logical channel identifier, LCID) field, and an L field, and may further include an extended LCID (eLCID) field. Definitions of the fields are described as follows:

(1) LCID field: The LCID field corresponds to a logical channel instance of a MAC SDU, a MAC CE, or a padding type.

(2) eLCID field: The eLCID field corresponds to a logical channel instance of a MAC SDU.

(3) L field: L indicates a length, and the L field indicates a length of a corresponding MAC SDU or a length of a variable MAC CE, and is in a unit of byte.

(4) F field: F indicates a format, and the F field indicates a size of the L field.

(5) R field: The R field indicates a reserved bit.

The R/LCID subheader includes an R field and an LCID field. Definitions of the fields are the same as definitions of the fields in the R/F/LCID/L subheader, and details are not described again.

In this embodiment of this application, the first sub-protocol data unit may be a MAC subPDU including a MAC CE. In the first sub-protocol data unit, the first subheader may be an R/LCID subheader in the MAC subPDU including a MAC CE in FIG. 5, and the first control element may be a MAC CE in the MAC subPDU including a MAC CE in FIG. 5.

Optionally, a structure of an R/LCID subheader may be any one of the following:

FIG. 6 is a schematic diagram of a structure of an R/LCID subheader. As shown in FIG. 6, the R/LCID subheader includes eight bits, where six bits are an LCID field, a value of the LCID field indicates a logical channel number, and the other two bits are reserved bits.

When the structure is used, the first field may be the six-bit LCID field in FIG. 6. When the first field has six bits, there may be 64 values. In an optional implementation, a first value of the first field may be used to identify that the information about the first priority is transmitted.

For example, the first value may be 61. When the value of the LCID field in the R/LCID subheader is 61, it indicates that the information about the first priority is carried in the MAC CE for transmission.

FIG. 7 is a schematic diagram of another structure of an R/LCID subheader. As shown in FIG. 7, the R/LCID subheader includes 16 bits, where a reserved bit is one bit, an F bit is one bit, an LCID field is six bits, and an extended LCID (eLCID) field is eight bits. A definition indicated by the F bit is the same as a definition of the F field described in FIG. 5.

When the structure is used, the first field may be the six-bit LCID field in FIG. 7, the eight-bit eLCID field in FIG. 7, or some or all bits of the six-bit LCID field and the eight-bit eLCID field. Correspondingly, the first field may have a plurality of values. In an optional implementation, a first value of the first field may be used to identify that the information about the first priority is transmitted.

Based on the structure of the R/LCID subheader shown in FIG. 6 or FIG. 7, the first subheader may include M bits, M is an integer multiple of 8, the first field occupies N bits in the first subheader, and N is an integer greater than or equal to 6.

In an optional implementation, the first control element includes a second field, and the second field may indicate the information about the first priority.

Optionally, the second field may include three bits, two bits, one bit, or four bits.

FIG. 8 is a schematic diagram of a structure of the first control element. As shown in FIG. 8, the first control element includes eight bits, the second field occupies three bits, and the remaining bits are reserved bits.

It is assumed that a value range of the priority is 1 to 8. In the structure shown in FIG. 8, the second field may indicate one priority. For example, when the second field is 000, it indicates that the priority is 1, namely, a highest priority.

FIG. 9 is a schematic diagram of another structure of the first control element. As shown in FIG. 9, the first control element includes eight bits, the second field occupies two bits, and the remaining bits are reserved bits.

For example, the first priority is a priority in the priority list $\{1, 3, 5, 7\}$. When the second field is 00, it indicates that the first priority is 1, namely, a highest priority.

Optionally, the priority list is preset or pre-configured, and is stored in the first device and the second device.

FIG. 10 is a schematic diagram of still another structure of the first control element. As shown in FIG. 10, the first control element includes eight bits, the second field occupies one bit, and the remaining bits are reserved bits.

For example, the first priority is a priority in the priority list $\{1, 3, 5, 7\}$. When the second field is 0, it indicates that the first priority is 1, namely, a highest priority.

Optionally, the priority list is preset or pre-configured, and is stored in the first device and the second device.

It should be understood that, because the second field indicates the information about the first priority, a value of the second field may be the first priority, or may be a value related to the first priority.

In another example, the second field includes four bits, and the four bits may indicate a difference corresponding to the first priority. It is assumed that a value range of the priority is an integer from 1 to 8, and the four bits may include an integer range of $[-7, 8]$. For example, it is assumed that a value indicated by the four bits is $-7$, that is, a difference is −7. The second device may obtain the first priority through calculation based on the first difference.

It should be noted that the solutions in this embodiment of this application are applicable to unicast, multicast, and broadcast scenarios. Therefore, correspondingly, the structures of the first control element shown in FIG. 8 to FIG. 10 are also applicable to unicast, multicast, and broadcast scenarios.

In an optional implementation, the first control element may further include a third field, and the third field may indicate geographical location information of the second device.

The structure of the first control element shown in FIG. 8 is used as an example. The third field may occupy the remaining five bits other than the second field. Alternatively, the third field may occupy fewer bits or more bits in the third control element.

For example, the geographical location information of the second device may be a zone ID of the second device.

The first device adds the geographical location information of the second device to the first control element, so that the second device can perform resource selection or another operation based on the geographical location information.

As described above, the geographical location information may be used to request a second device at a specific geographical location, or may assist a second device at a specific geographical location.

For example, if the first device is the terminal device B, the geographical location information may be used to request a terminal device A at a specific geographical location. If the first device is the terminal device A, the geographical location information may assist a terminal device B at a specific geographical location.

The foregoing describes a manner in which the MAC CE carries the information about the first priority. In the manner, the information about the first priority can be dynamically indicated. In addition, because the MAC CE can carry a large amount of information, the MAC CE may be used to carry the information about the first priority, and the MAC CE may be used to carry other information, for example, geographical location information of the second device.

The following describes a manner in which the information about the first priority is carried in the SCI.

Optionally, the information about the first priority may be carried in SCI of a control channel, or may be carried in SCI of a data channel.

The SCI of the control channel may also be referred to as SCI 1 or first-order SCI. The SCI of the data channel may also be referred to as SCI 2 or second-order SCI.

The information about the first priority is carried in the first-order SCI, so that the information about the first priority can be more flexibly and dynamically indicated. This helps another device decode the information about the first priority during resource sensing, and further provides more reference information for determining in resource selection and preemption.

Because a size of the first-order SCI is limited, the information about the first priority may alternatively be carried in the second-order SCI. In this manner, the information about the first priority can also be flexibly and dynamically indicated. The second device may demodulate the second-order SCI after demodulating the first-order SCI, to obtain the information about the first priority. When the information about the first priority is indicated by using second-order SCI in a new format, a "second-order SCI format" field in the first-order SCI may indicate the information about the first priority indicated by the second-order SCI.

When the information about the first priority is carried in the SCI of the control channel, any one of the following two manners may be used.

In a first manner, the SCI of the control channel may include a fourth field, and the fourth field may indicate the first priority.

The fourth field occupies a preset bit in the SCI of the control channel, for example, may occupy three bits, two bits, or one bit. The preset bit may be used to indicate a specific priority, a priority range, or the like.

In an example, the fourth field occupies three bits. It is assumed that a value range of the priority is 1 to 8, and the fourth field may indicate a specific first priority.

In another example, the fourth field occupies two bits. For example, it is assumed that the first priority is a priority in the priority list {1, 3, 5, 7}. When the fourth field is 00, it indicates that the first priority is 1, namely, a highest priority.

Optionally, the priority list is preset or pre-configured, and is stored in the first device and the second device.

In another example, the fourth field occupies one bit. For example, it is assumed that the first priority is a priority in the priority list {1, 3, 5, 7}. When the fourth field is 0, it indicates that the first priority is 1, namely, a highest priority.

Optionally, the priority list is preset or pre-configured, and is stored in the first device and the second device.

In a second manner, the SCI of the control channel may include a fourth field, and the fourth field may indicate a second difference corresponding to the first priority.

The second difference is a difference between the first priority and the second priority.

In the second manner, the first priority may be a sum of the second priority and the second difference, or a difference between the second priority and the second difference. In addition, the second difference may be a positive number or a negative number.

In an example, it is assumed that the second priority is $P_i$, the first priority is $P_A$, the second difference is delta2, and the first priority is a sum of the second priority and the second difference. The first priority may be obtained according to the following formula (3):

$$P_A = P_i + \text{delta2} \tag{3}$$

It should be noted that, if the value obtained through calculation according to the formula (3) is greater than a maximum value of the priority, the maximum value of the priority is used as the value of the first priority. For example, a value range of the priority is an integer from 1 to 8. If the value obtained through calculation according to the formula (3) is greater than 8, the value of the first priority may be considered as 8.

If the value obtained through calculation according to the formula (3) is less than a minimum value of the priority, the minimum value of the priority is used as the value of the first priority. For example, a value range of the priority is an integer from 1 to 8. If the value obtained through calculation according to the formula (3) is less than 1, the value of the first priority may be considered as 1.

In another example, it is assumed that the second priority is $P_i$, the first priority is $P_A$, the second difference is delta2, and the first priority is a difference between the second priority and the second difference. The first priority may be obtained according to the following formula (4):

$$P_A = P_i - \text{delta2} \tag{4}$$

It should be noted that, if the value obtained through calculation according to the formula (4) is greater than a maximum value of the priority, the maximum value of the priority is used as the value of the first priority. For example, a value range of the priority is an integer from 1 to 8. If the value obtained through calculation according to the formula (4) is greater than 8, the value of the first priority may be considered as 8.

If the value obtained through calculation according to the formula (4) is less than a minimum value of the priority, the minimum value of the priority is used as the value of the first priority. For example, a value range of the priority is an integer from 1 to 8. If the value obtained through calculation according to the formula (4) is less than 1, the value of the first priority may be considered as 1.

When the information about the first priority is carried in the SCI of the data channel, any one of the following two manners may be used.

In a first manner, the SCI of the data channel may include a fifth field, and the fifth field may indicate the first priority.

In an example, the fifth field occupies three bits. It is assumed that a value range of the priority is 1 to 8, and the fifth field may indicate a specific first priority.

In another example, the fifth field occupies two bits. For example, it is assumed that the first priority is a priority in the priority list {1, 3, 5, 7}. When the fifth field is 00, it indicates that the first priority is 1, namely, a highest priority.

Optionally, the priority list is preset or pre-configured, and is stored in the first device and the second device.

In another example, the fifth field occupies one bit. For example, it is assumed that the first priority is a priority in the priority list {1, 3, 5, 7}. When the fifth field is 0, it indicates that the first priority is 1, namely, a highest priority.

Optionally, the priority list is preset or pre-configured, and is stored in the first device and the second device.

In a second manner, the SCI of the data channel may include a fifth field, and the fifth field may indicate a second difference corresponding to the first priority.

The second difference is a difference between the first priority and the second priority.

In the second manner, the first priority may be a sum of the second priority and the second difference, or a difference between the second priority and the second difference. In addition, the second difference may be a positive number or a negative number.

A manner of obtaining the first priority based on the second difference in the manner is the same as a manner of obtaining the first priority based on the second difference in the control channel. For details, refer to the foregoing descriptions. Details are not described herein again.

Optionally, when the information about the first priority is carried in the SCI of the data channel, the SCI of the data channel may be SCI2-A, or SCI2-B, or may be SCI, for example, SCI2-C, other than SCI2-A and SCI2-B.

Figure 11:
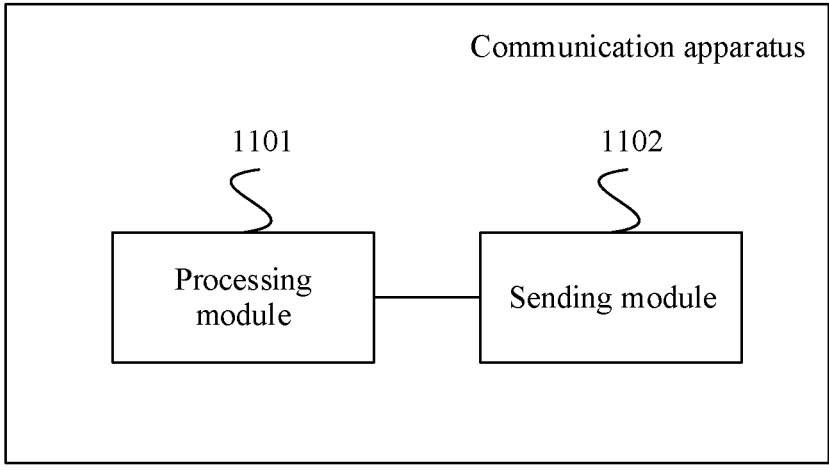
FIG. 11 is a diagram of a module structure of a communication apparatus according to an embodiment of this application.

FIG. 11 is a diagram of a module structure of a communication apparatus according to an embodiment of this application. The apparatus may be the first device or an apparatus that can enable the first device to implement a function of the first device in the method provided in embodiments of this application. For example, the apparatus may be an apparatus or a chip system in the first device. As shown in FIG. 11, the apparatus includes a processing module 1101 and a sending module 1102.

The processing module 1101 is configured to send information about a first priority and a second priority to a second device by using the sending module 1102.

The first priority is used to assist the second device in selecting a resource for sidelink transmission, the information about the first priority is carried in SCI and/or a MAC CE, and the second priority is a physical layer priority of a first device.

In an optional implementation, the processing module 1101 is further configured to send first information to the second device by using the sending module 1102, and the first information includes any one of the following:

a resource set for sidelink transmission determined by the first device, and information used by the first device to select a sidelink transmission resource.

In an optional implementation, the second priority is a preset value, or the second priority is a priority in a preset priority list, and the preset priority list includes a plurality of priorities.

In an optional implementation, the second priority is related to the first priority.

In an optional implementation, the second priority is related to a range of the first priority.

In an optional implementation, the second priority is a sum of the first priority and a first difference, or the second priority is a difference between the first priority and a first difference.

In an optional implementation, the first difference is indicated by using RRC signaling, or the first difference is a pre-configured value. The first difference may be a positive number or a negative number.

In an optional implementation, the second priority is a higher priority between the first priority and a logical channel priority, and the logical channel priority is a highest priority in logical channel priorities corresponding to data of a PSSCH.

In an optional implementation, the information about the first priority is carried in a first sub-protocol data unit, the first sub-protocol data unit is a medium access control sub-protocol data unit, the first sub-protocol data unit includes a first subheader and a first control element, the first subheader includes a first field, and the first field indicates a logical channel number.

In an optional implementation, a first value of the first field in the first subheader indicates that the information about the first priority is transmitted.

In an optional implementation, the first subheader includes M bits, M is an integer multiple of 8, the first field occupies N bits in the first subheader, and N is an integer greater than or equal to 6.

In an optional implementation, the first control element includes a second field, and the second field indicates the information about the first priority.

In an optional implementation, the second field includes three bits, two bits, one bit, or four bits.

In an optional implementation, the first control element further includes a third field, and the third field indicates the geographical location information of the second device.

In an optional implementation, the information about the first priority is carried in the SCI.

In an optional implementation, SCI of a control channel includes a fourth field, the fourth field indicates the first priority, or the fourth field indicates a second difference corresponding to the first priority, and the second difference is a difference between the first priority and the second priority.

In an optional implementation, SCI of a data channel includes a fifth field, and the fifth field indicates the first priority or a second difference corresponding to the first priority.

In an optional implementation, the SCI of the data channel includes SCI2-A, SCI2-B, or SCI other than SCI2-A and SCI2-B.

In an optional implementation, the first priority is a sum of the second priority and the second difference, or the first priority is a difference between the second priority and the second difference, and the second difference may be a positive number or a negative number.

Figure 12:
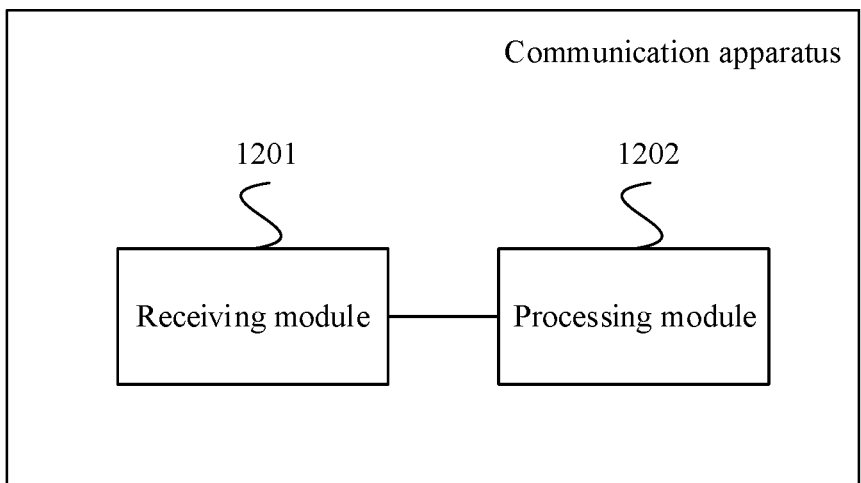
FIG. 12 is a diagram of a module structure of another communication apparatus according to an embodiment of this application.

FIG. 12 is a diagram of a module structure of another communication apparatus according to an embodiment of this application. The apparatus may be the second device or an apparatus that can enable the second device to implement a function of the second device in the method provided in embodiments of this application. For example, the apparatus may be an apparatus or a chip system in the second device. As shown in FIG. 12, the apparatus includes:

a receiving module 1201, configured to receive information about a first priority and a second priority from a first device, where the first priority is used to assist a second device in selecting a resource for sidelink transmission, the information about the first priority is carried in SCI and/or a MAC CE, and the second priority is a physical layer priority of the first device; and a processing module 1202, configured to select, based on the information about the first priority, a resource for sidelink transmission.

In an optional implementation, the receiving module 1201 is further configured to receive first information from the first device, and the first information includes any one of the following:

a resource set for sidelink transmission determined by the first device, and information used by the first device to select a sidelink transmission resource.

In an optional implementation, the second priority is a preset value, or the second priority is a priority in a preset priority list, and the preset priority list includes a plurality of priorities.

In an optional implementation, the second priority is related to the first priority.

In an optional implementation, the second priority is related to a range of the first priority.

In an optional implementation, the second priority is a sum of the first priority and a first difference, or the second priority is a difference between the first priority and a first difference.

In an optional implementation, the first difference is indicated by using RRC signaling, or the first difference is a pre-configured value. The first difference may be a positive number or a negative number.

In an optional implementation, the second priority is a higher priority between the first priority and a logical channel priority, and the logical channel priority is a highest priority in logical channel priorities corresponding to data of a PSSCH.

In an optional implementation, the information about the first priority is carried in a first sub-protocol data unit, the first sub-protocol data unit is a medium access control sub-protocol data unit, the first sub-protocol data unit includes a first subheader and a first control element, the first subheader includes a first field, and the first field indicates a logical channel number.

In an optional implementation, a first value of the first field in the first subheader indicates that the information about the first priority is transmitted.

In an optional implementation, the first subheader includes M bits, M is an integer multiple of 8, the first field occupies N bits in the first subheader, and N is an integer greater than or equal to 6.

In an optional implementation, the first control element includes a second field, and the second field indicates the information about the first priority.

In an optional implementation, the second field includes three bits, two bits, one bit, or four bits.

In an optional implementation, the first control element further includes a third field, and the third field indicates the geographical location information of the second device.

In an optional implementation, the information about the first priority is carried in the SCI.

In an optional implementation, SCI of a control channel includes a fourth field, the fourth field indicates the first priority, or the fourth field indicates a second difference corresponding to the first priority, and the second difference is a difference between the first priority and the second priority.

In an optional implementation, SCI of a data channel includes a fifth field, and the fifth field indicates the first priority or a second difference corresponding to the first priority.

In an optional implementation, the SCI of the data channel includes SCI2-A, SCI2-B, or SCI other than SCI2-A and SCI2-B.

In an optional implementation, the first priority is a sum of the second priority and the second difference, or the first priority is a difference between the second priority and the second difference, and the second difference may be a positive number or a negative number.

The communication apparatus provided in the embodiments of this application may perform steps of the method in the method embodiments. The implementation principles and the technical effects of the optical module are similar to those in the method embodiment. Details are not described herein again.

It should be noted and understood that division of the modules of the foregoing apparatus is merely logic function division. During actual implementation, some or all modules may be integrated into one physical entity, or the modules may be physically separated. The modules may be all implemented in a form of software invoked by a processing element, or may be all implemented in a form of hardware. Alternatively, some modules may be implemented in a form of software invoked by a processing element, and some modules are implemented in a form of hardware. For example, a determining module may be a processing element separately disposed, or may be integrated in a chip of the foregoing apparatus for implementation. In addition, the determining module may alternatively be stored in the memory of the foregoing apparatus in a form of program code, and is invoked by a processing element of the foregoing apparatus to perform a function of the determining module. Implementations of other modules are similar to the implementation of the determining module. In addition, all or some of the modules may be integrated together, or may be implemented independently. The processing element herein may be an integrated circuit, and have a signal processing capability. In an implementation process, steps in the methods or the modules can be implemented by using a hardware integrated logical circuit in the processing element, or by using instructions in a form of software.

For example, the foregoing modules may be configured as one or more integrated circuits for implementing the foregoing method, such as one or more application-specific integrated circuits (application-specific integrated circuit, ASIC), one or more microprocessors (digital signal processor, DSP), or one or more field programmable gate arrays (field programmable gate array, FPGA). For another example, when one of the foregoing modules is implemented in a form of scheduling program code by a processing element, the processing element may be a general-purpose processor, such as a central processing unit (central processing unit, CPU) or another processor that can invoke the program code. For another example, the modules may be integrated together, and implemented in a form of a system-on-a-chip (system-on-a-chip, SOC).

All or some of the embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid-state disk, SSD)), or the like.

Figure 13:
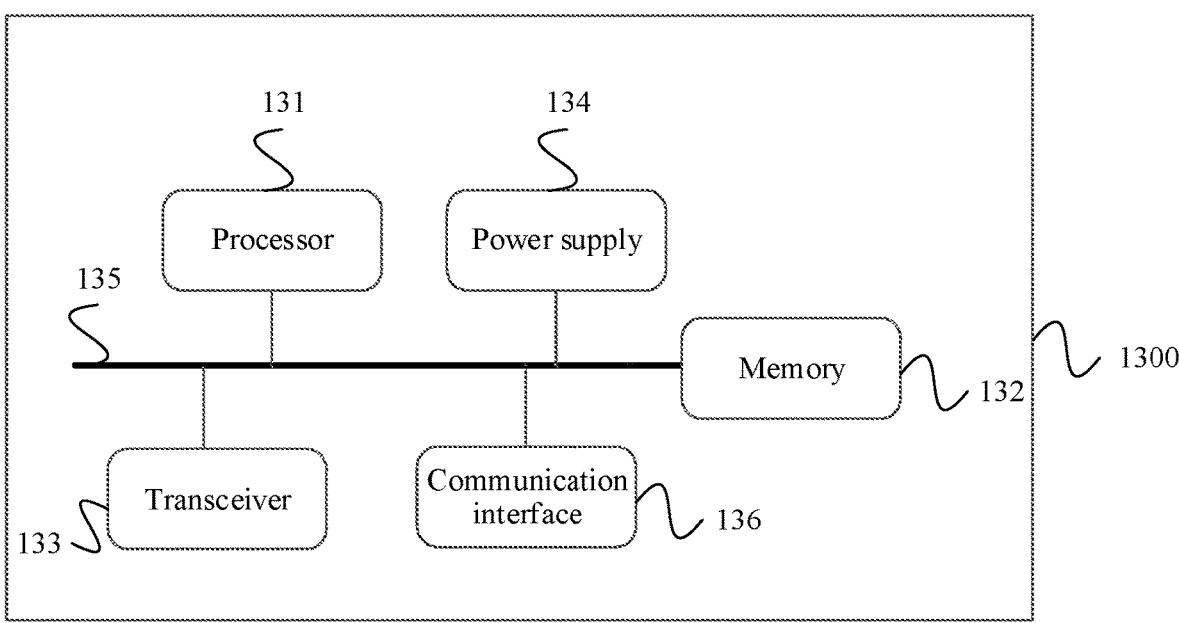
FIG. 13 is a schematic diagram of a structure of a communication apparatus according to an embodiment of this application.

FIG. 13 is a schematic diagram of a structure of a communication apparatus according to an embodiment of this application. The communication apparatus may be the first device or the second device described in the foregoing embodiments. As shown in FIG. 13, a communication apparatus 1300 may include a processor 131 (for example, a CPU). Optionally, the communication apparatus may further include a memory 132 and/or a transceiver 133. The transceiver 133 is coupled to the processor 131, and the processor 131 controls sending and receiving actions of the transceiver 133. The memory 132 may store various instructions, to implement various processing functions and implement steps of the method performed by the first device or the second device in embodiments of this application.

Optionally, the communication apparatus in this embodiment of this application may further include a power supply 134, a system bus 135, and a communication interface 136. The transceiver 133 may be integrated into a transceiver machine of the communication apparatus, or may be an independent transceiver antenna of the communication apparatus. The system bus 135 is configured to implement communication connections between components. The communication interface 136 is configured to implement connection and communication between the communication apparatus and another peripheral.

In this embodiment of this application, the processor 131 is configured to be coupled to the memory 132, and read and execute the instructions in the memory 132, to implement steps of the method performed by the first device or the second device in the method embodiments. The transceiver 133 is coupled to the processor 131, and the processor 131 controls the transceiver 133 to send and receive a message. Implementation principles and technical effects of the transceiver 133 are similar to those of the method embodiments. Details are not described herein again.

The system bus mentioned in FIG. 13 may be a peripheral component interconnect (peripheral component interconnect, PCI) bus, an extended industry standard architecture (extended industry standard architecture, EISA) bus, or the like. The system bus may be classified into an address bus, a data bus, a control bus, or the like. For ease of indication, the system bus is indicated by using only one bold line in the figure. However, it does not indicate that there is only one bus or only one type of bus. The communication interface is configured to implement communication between a database access apparatus and another device (for example, a client, a read/write database, and a read-only database). The memory may include a RAM, and may further include a nonvolatile memory (nonvolatile memory), for example, at least one magnetic disk memory.

The processor mentioned in FIG. 13 may be a general-purpose processor, including a central processing unit CPU, a network processor (network processor, NP), or the like, a digital signal processor DSP, an application-specific integrated circuit ASIC, a field programmable gate array FPGA or another programmable logic device, a discrete gate or a transistor logic device, a discrete hardware component, or the like.

Optionally, an embodiment of this application further provides a readable storage medium. The storage medium stores instructions. When the instructions are run on a computer, the computer is enabled to perform the method in the embodiments shown in FIG. 2 to FIG. 10.

Optionally, an embodiment of this application further provides a chip for running instructions, and the chip is configured to perform the method in the embodiments shown in FIG. 2 to FIG. 10.

An embodiment of this application further provides a program product, including a computer program. The computer program is stored in a storage medium, at least one processor may read the computer program from the storage medium, and the at least one processor executes the computer program, to implement the method in the embodiments shown in FIG. 2 to FIG. 10.

In embodiments of this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. In a formula, the character "I" indicates a "division" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

It may be understood that various numbers in embodiments of this application are merely for distinguishing for ease of description, and are not intended to limit the scope of embodiments of this application.

It may be understood that sequence numbers of the foregoing processes do not mean execution sequences in various embodiments of the present invention. The execution sequences of the processes should be determined based on functions and internal logic of the processes, and should not be construed as any limitation on the implementation processes of embodiments of this application.

Finally, it should be noted that the foregoing embodiments are merely intended for describing the technical solutions of the present invention, but not for limiting this application. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the present invention.

What is claimed is:

1. A communication method, comprising:
   receiving, from a first device, a first priority for a second device in selecting a resource for sidelink transmission of the first device and a second priority indicating a priority of a physical sidelink shared channel (PSSCH), wherein the first priority is carried in sidelink control information 2-C(SCI 2-C) on the PSSCH or a medium access control control element (MAC CE), the SCI 2-C comprises a fifth field that occupies 3 bits and indicates the first priority and wherein the second priority is carried in SCI on a physical sidelink control channel (PSCCH); and
   selecting, based on the first priority, a resource for sidelink transmission of the first device.

2. The method according to claim 1, further comprising:
   receiving a coordination request from the first device.

3. The method according to claim 2, wherein the first priority is obtained based on the coordination request.

4. The method according to claim 2, wherein the coordination request comprises the first priority and the second priority.

5. The method according to claim 1, wherein a value of the second priority is 1.

6. The method according to claim 1, wherein the second priority is carried in SCI 1 on the PSCCH.

7. The method according to claim 1, wherein the first priority is carried in a medium access control sub-protocol data unit, the medium access control sub-protocol data unit comprises a first subheader and a first control element, the first subheader comprises a first field, and the first field indicates a logical channel number.

8. The method according to claim 7, wherein a first value of the first field in the first subheader indicates that the first priority is transmitted.

9. The method according to claim 1, further comprising:
   selecting the resource for sidelink transmission of the first device, based on: the first priority, a location and a length of a resource sensing window, a quantity of resource selection frequency domain sub-bandwidths, a transmission period, and resource pool information.

10. A wireless apparatus, comprising:
    one or more processors; and
    a memory storing instructions for execution by the one or more processors for performing operations comprising:
    receiving a first priority for the wireless apparatus in selecting a resource for sidelink transmission of a first device and a second priority indicating a priority of a physical sidelink shared channel (PSSCH), wherein the first priority is carried in sidelink control information 2-C(SCI 2-C), on the PSSCH or a medium access control control element (MAC CE), the SCI 2-C comprises a fifth field that occupies 3 bits and indicates the first priority and wherein the second priority is carried in SCI on a physical sidelink control channel (PSCCH); and
    selecting, based on the first priority, a resource for sidelink transmission of the first device.

11. The wireless apparatus according to claim 10, further comprising:
    receiving a coordination request from the first device.

12. The wireless apparatus according to claim 11, wherein the first priority is obtained based on the coordination request.

13. The wireless apparatus according to claim 11, wherein the coordination request comprises the first priority and the second priority.

14. The wireless apparatus according to claim 10, wherein a value of the second priority is 1.

15. The wireless apparatus according to claim 10, wherein the second priority is carried in SCI 1 on the PSCCH.

16. The wireless apparatus according to claim 10, wherein the first priority is carried in a medium access control sub-protocol data unit, the medium access control sub-protocol data unit comprises a first subheader and a first control element, the first subheader comprises a first field, and the first field indicates a logical channel number.

17. The wireless apparatus according to claim 16, wherein a first value of the first field in the first subheader indicates that the first priority is transmitted.

18. The wireless apparatus according to claim 10, further comprising:
    selecting the resource for sidelink transmission of the first device, based on the first priority, a location and a length of a resource sensing window, a quantity of resource selection frequency domain sub-bandwidths, a transmission period, and resource pool information.

* * * * *